April 2, 1935.  H. R. HOLBROOK  1,996,513
FASTENER AND METHOD OF MAKING THE SAME Filed April 6, 1934

Inventor
Harry R. Holbrook
by Roberts, Cushman & Woodberry
att'ys.

Patented Apr. 2, 1935

1,996,513

UNITED STATES PATENT OFFICE 1,996,513

FASTENER AND METHOD OF MAKING THE SAME

Harry R. Holbrook, Attleboro, Mass., assignor to The Mason Box Company, Attleboro Falls, Mass., a corporation of Massachusetts Application April 6, 1934, Serial No. 719,324

13 Claims. (Cl. 140—82)

This invention relates to an improvement in fasteners of the type used for temporarily securing separable portions of a box, envelope or the like container, and to a method of making the same, the present application being directed to subject matter shown in copending application Serial No. 563,344, filed September 17, 1931.

The principal object of the invention is to provide a method whereby fasteners of the aforesaid type may be made in the form of a strip of indefinite length, which strip may be either severed or cut up and formed into individual blanks or units before being applied to a box or container, or severed and applied to a box or container at approximately the same time and during one operation.

Other objects are to provide a fastener of the type specified which will effect a secure joinder of a box and its cover and which is easily fastened and unfastened; to provide a fastener having its foldable clip or tongue constructed of looped ductile wire thereby to provide greater strength and security and at the same time render it free from sharp edges and projecting parts which are liable to scratch and injure the fingers of the user; to provide a fastener of the type specified which embodies a sheet metal plate or shield covering the legs of the loop member and having prongs or projections adapted to be clenched against the inside of the box or container to insure greater security and less chance of becoming loosened or deranged; and to provide a fastener which is economical to manufacture, which has a minimum number of parts, and which is particularly neat in appearance and durable for repeated use over long periods of time.

Further objects relate to the method of manufacture and to various features of construction, and will be apparent from a consideration of the following description and accompanying drawing wherein.

Each of the fasteners herein shown comprises a relatively thin sheet metal plate or shield having legs or prongs projecting outwardly substantially at right angles to its main body portion and adapted to be pierced through the side of a box or other container and clinched on the inside thereof permanently to attach the fastener thereto. Projecting upwardly from the platelike base or shield is a clip member formed of a loop of ductile wire and adapted to be inserted through a slit or other opening in the cover of the box and to be folded over the side thereof temporarily to secure the cover to the box.

Figure 1:
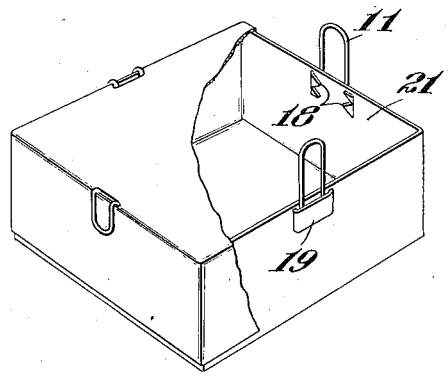
Fig. 1 is a perspective view of a box provided with a fastener constructed in accordance with the present invention.

In accordance with the present invention the fasteners are made in the form of a continuous strip wherein the looped members forming the clips are first shaped and then individually applied in spaced relation to each other to a strip of suitable sheet material which provides the shield or plate of the finished unit. After being properly positioned on the strip, the individual clips are permanently secured thereto in any suitable manner, as, for example, by welding or soldering their contiguous parts, or by forming inwardly projecting tabs which clench about the legs or end portions of the loop member. Having thus formed a strip of fastener elements, the individual fastener units may be formed by severing the strip between adjacent loop members, preferably by a serrated cut so as to provide the cut strip with pointed ends which may be bent inwardly and applied to a container as shown in Fig. 1.

Figure 3:
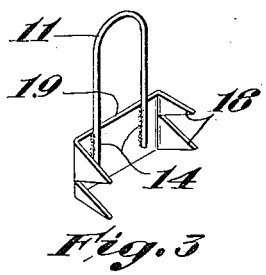
Fig. 3 is a perspective view of a finished unit cut from the strip shown in Fig. 2.
Figure 2:
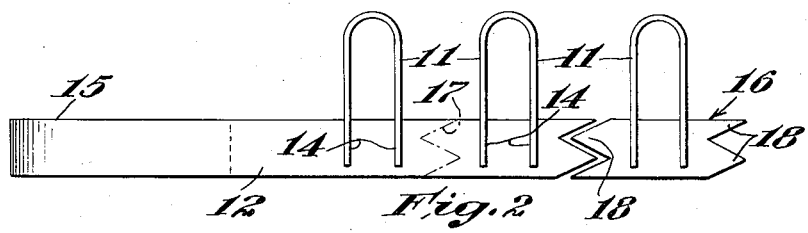
Fig. 2 is a view showing a strip of sheet metal with the loops or tongues attached thereto and illustrating the method of making the individual units.

Referring to the embodiment shown in Figs. 2 and 3, the loop members or clips 11 are first formed by bending suitable lengths of ductile wire into U- or hairpin-shaped pieces. The preformed clips 11 are individually applied to a strip 12 of sheet metal which may be drawn from a supply roll 15 and which may be of any desired width and of indefinite length, the individual loop members being spaced equal distances along the strip, as indicated in Fig. 2. After being properly positioned on the strip 12, the individual loop members 11 are then permanently secured thereto, preferably by welding or soldering their free ends or legs 14 to the underlying portions of the strip 12, thereby integrally uniting their contiguous parts. The successive steps of applying and/or positioning the preformed loop members on the strip and then welding or soldering may be formed by hand or automatically by machine, and in either case the operation may be carried on progressively as the strip 12 is fed from the supply roll 15, thereby producing a strip of fasteners of indefinite length which may be cut up into individual blanks or units 16 either before or at approximately the same time they are applied to a box or container.

The individual fastener units are severed or stamped out from the completed strip preferably by a serrated cut 17 intermediate the loop members, as shown in Fig. 2, the serrated cut providing pointed ends or prongs 18 on each end of the severed blank or unit 16. In the completed unit the prongs 18 are bent inwardly substantially at right angles to the plane of the body portion or shield 19, as shown in Fig. 3, so that the prongs 18 may be readily inserted or driven through the wall 21 of a box or container and clenched against its inner face, as shown in Fig. 1.

It will be noted that when the blanks 16 are stamped out or severed in the manner above described, each blank or unit is provided with pointed end portions comprising a wide tooth and a narrow tooth arranged in alternate relationship so that all blanks or units are of the same form and only one contour of cutting tool is required. Furthermore, the severing of each blank from the strip forms the teeth at the end of the succeeding blank, thus permitting a rapid and continuous production without the slightest waste of stock.

When the fastener units are thus made in the form of a continuous strip, as shown in Fig. 2, they may be fed to a machine or apparatus in which they may be severed from the strip, their pointed prongs bent over and pierced through the sides of a box, and finally clinched, all in a single operation. When such an automatic machine is employed, the use of the strip form of fasteners is of inestimable value, and owing to its economical method of manufacture, it may be sold at a comparatively low cost as a supply for box fastening machines.

It will be noted that when a fastener unit embodying the construction shown in Figs. 2 and 3 is applied to a box or the like container, as shown in Fig. 1, the plate or shield 19 is disposed on the outside of the box and holds the loop member 11 securely against the outer surface of the wall 21, thus overcoming any danger of the loop member becoming deranged. Moreover, as a shield 19 completely covers the legs 14 of the loop member and presents a smooth surface, free from projecting parts and sharp edges, there is no danger of scratching or injuring the fingers of the user.

Figure 4:
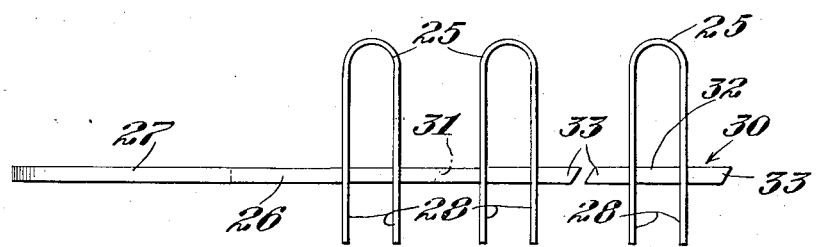
Fig. 4 is a view similar to Fig. 2 but showing a strip of fasteners of modified construction.

In the embodiment shown in Figs. 4 to 7, the preformed loop members 25 are applied to the strip 26 which is drawn from the supply roll 27, and integrally united therewith in a manner similar to that described in the previous embodiment. In this embodiment, however, the strip 26 may, if desired, be relatively narrower than the strip 12 shown in Fig. 2, and the end portions of the legs 28 of the loop member may project a substantial distance beyond the edge of the strip 26, as shown in Fig. 4. The individual blanks or units 30 preferably are severed by a diagonal or angular cut 31 across the strip 26, thus providing the shield or body portion 32 of the blank with pointed ends or prongs 33.

Figure 5:
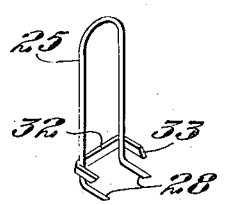
Fig. 5 is a perspective view showing a finished unit cut from the strip shown in Fig. 4, and Figs. 6 and 7 are longitudinal and transverse sections, respectively, through the wall of a box or container to which has been attached a fastener of the type shown in Fig. 5.
Figure 6:
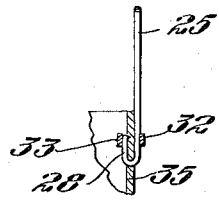
Figure 7:
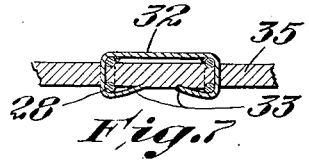

Either before applying the unit 30 to a container, or at approximately the same time the units are applied, the projecting ends of their legs 28 and the prongs 33 are bent inwardly substantially at right angles to the plane of the body portion 32, as shown in Fig. 5, thereby providing four prongs which may be driven through the wall 35 of a container and clenched against its inner face, as shown in Figs. 6 and 7. When thus applied, the loop member is held firmly against the outer face of the wall 35 and the upwardly bent or hooked ends 28 of the loop member are clenched against the inner face of the wall 35 and provide a fulcrum, slightly spaced from the inner face of the wall 35, about which the prongs 33 may be bent toward each other so that their sharp ends may be embedded in the wall 35, as shown in Fig. 7. It will be noted that the intermediate portions of the prongs overlap or cover the sharp ends of the legs 28 and present relatively smooth rounded surfaces, thereby avoiding sharp edges and projections which might otherwise scratch or injure the hands of the user or catch on and damage articles with which they might come in contact.

While I have shown and described different desirable constructions and procedures, it is to be understood that the present disclosure is for the purpose of illustration only and that various changes and modifications may be made without departing from the spirit and scope of the invention as set forth in the appended claims.

I claim

1. A method of manufacturing fasteners of the class described, comprising preparing a plurality of U-shaped wire loops, applying the individual loops to the surface of an elongate strip of sheet-metal in spaced relation to each other, permanently joining the legs of said loops to the underlying portions of said strip, and severing said strip intermediate the loops to form individual fastener units.

2. A method of manufacturing fasteners of the class described, comprising preparing a plurality of U-shaped wire loops, applying the individual loops to the surface of an elongate strip of sheet-metal in spaced relation to each other, welding the legs of said loops to the underlying portions of said strip, and severing said strip intermediate the loops to form individual fastener units.

3. A method of manufacturing fasteners of the class described, comprising preparing a plurality of U-shaped wire loops, applying the individual loops to the surface of an elongate strip of sheet-metal in spaced relation to each other, soldering the legs of said loops to the underlying portions of said strip, and severing said strip intermediate the loops to form individual fastener units.

4. A method of manufacturing fasteners in connected series which comprises providing a ribbon-like strip of metal, providing hairpin-shaped loops of wire and spacing them at intervals along the length of the strip, permanently joining the legs of the loops to the side of the strip, and finally severing the strip between the loops to form pointed ends, and bending the points so formed at right angles to the face of the strip to provide prongs for insertion through the side of a box.

5. A method of manufacturing fasteners for the covers of boxes and other containers, which comprises providing a ribbon-like strip of sheet-metal, providing a plurality of hairpin-shaped wire loops and arranging them in spaced relation along the strip with the ends of their legs overlying the face of the latter, joining the legs of the loops to the strip, severing the strip into blanks between the wire loops with an angular cut to provide pointed portions at opposite ends of the blanks, and finally bending said pointed portions at right angles to the plane of the latter to form prongs.

6. A method of manufacturing fasteners of the class described comprising preparing a plurality of U-shaped wire loops, applying the individual loops to the surface of an elongate strip of sheet-metal in spaced relation to each other so that the ends of their legs are disposed between the longitudinal edges of said strip, joining the legs of said loop to the underlying portions of said strip, and severing said strip intermediate successive loops by a serrated cut to form individual fastener units having prongs for insertion through the wall of a container.

7. A method of manufacturing fasteners of the class described comprising preparing a plurality of U-shaped wire loops, applying the individual loops to the suface of an elongate strip of sheet-metal in spaced relation to each other so that the ends of their legs project beyond the adjacent longitudinal edge of said strip, joining said loops to the contiguous portions of said strip, and severing said strip intermediate said loops to form units.

8. A method of manufacturing fasteners of the class described comprising preparing a plurality of U-shaped wire loops, applying the individual loops to the surface of an elongate strip of sheet-metal in spaced relation to each other so that the ends of their legs project beyond the adjacent longitudinal edge of said strip, severing said strip intermediate said loops, and bending the ends of the severed strip and the free ends of said legs inwardly to form prongs for insertion through the wall of a container.

9. A method of manufacturing a continuous supply of fasteners of the class described, comprising drawing off a strip of sheet-metal from a supply roll, applying preformed, substantially U-shaped wire loops successively along one face of said strip in spaced relation to each other so that the closed ends of the loops project a substantial distance beyond the adjacent longitudinal edge of said strip, and progressively joining the legs of said loops permanently to said strip.

10. A method of manufacturing a continuous supply of fasteners of the class described, comprising drawing off a ribbon-like strip of sheet-metal from a supply roll, applying preformed substantially U-shaped wire loops successively along one face of said strip in spaced relation to each other so that the longitudinal edges of said strip lies between the end portions of said loops, and progressively joining the contiguous portions of said loops and strip permanently to each other.

11. An article of manufacture comprising an elongate strip of sheet-metal having loops of wire arranged at intervals therealong with their legs overlying the face of the strip and permanently joined thereto, said strip being adapted to be severed by a cut which provides pointed teeth at the sides of the individual loops for bending over at right angles to form prongs for clinching through the side of the box.

12. An article of manufacture comprising an elongate strip of sheet-metal having U-shaped loops of wire disposed along one face in uniformly spaced relation to each other and having their contiguous portions united, the ends of the legs of said loops being disposed between the longitudinal edges of said strip and their looped ends projecting beyond one of the longitudinal edges.

13. An article of manufacture comprising an elongate strip of sheet-metal having U-shaped loops of wire disposed along one face in uniformly spaced relation to each other and having their contiguous portions united, the closed ends of said loops projecting beyond one of the longitudinal edges of said strip and the legs of said loops projecting beyond the other of said longitudinal edges.

HARRY R. HOLBROOK.